United States Patent
Madasu et al.

(10) Patent No.: US 11,591,895 B2
(45) Date of Patent: Feb. 28, 2023

(54) SIMULATED ANNEALING ACCELERATED OPTIMIZATION FOR REAL-TIME DRILLING

(71) Applicant: LANDMARK GRAPHICS CORPORATION, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 350 days.

(21) Appl. No.: 16/754,850

(22) PCT Filed: Oct. 15, 2018

(86) PCT No.: PCT/US2018/055570
§ 371 (c)(1),
(2) Date: Apr. 9, 2020

(87) PCT Pub. No.: WO2019/118055
PCT Pub. Date: Jun. 20, 2019

(65) Prior Publication Data
US 2020/0240257 A1 Jul. 30, 2020

Related U.S. Application Data

(60) Provisional application No. 62/597,063, filed on Dec. 11, 2017.

(51) Int. Cl.
*E21B 44/00* (2006.01)
(52) U.S. Cl.
CPC .......... *E21B 44/00* (2013.01); *E21B 2200/20* (2020.05)

(58) Field of Classification Search
CPC ............................. E21B 44/00; E21B 2200/20
See application file for complete search history.

(56) References Cited

U.S. PATENT DOCUMENTS

2013/0066445 A1* 3/2013 Wang ..................... E21B 44/00
700/28
2014/0124265 A1 5/2014 Al-Yami et al.
(Continued)

FOREIGN PATENT DOCUMENTS

| WO | 2014011171 A1 | 1/2014 |
| WO | 2016160005 A1 | 10/2016 |

OTHER PUBLICATIONS

"Simulated Annealing", Wikipedia, Available Online at: https://en.wikipedia.org/w/index.php?title=Simulatedannealing&oldid=740620350, Sep. 22, 2016, pp. 1-10.
(Continued)

*Primary Examiner* — Dany E Akakpo
(74) *Attorney, Agent, or Firm* — Kilpatrick Townsend & Stockton LLP

(57) ABSTRACT

A system and method for controlling a drilling tool inside a wellbore makes use of simulated annealing and Bayesian optimization to determine optimum controllable drilling parameters. In some aspects, a computing device generates sampled exploration points using simulated annealing and runs a Bayesian optimization using a loss function and the exploration points to optimize at least one controllable drilling parameter to achieve a predicted value for a selected drilling parameter. In some examples, the selected drilling parameter is rate-of-penetration (ROP) and in some examples, the controllable drilling parameters include such parameters as rotational speed (RPM) and weight-on-bit (WOB). In some examples, the computing device applies the controllable drilling parameter(s) to the drilling tool to
(Continued)

achieve the predicted value for the selected drilling parameter and provide real-time, closed-loop control and automation in drilling.

20 Claims, 3 Drawing Sheets

(56) References Cited

U.S. PATENT DOCUMENTS

2015/0105912 A1* 4/2015 Dykstra ............... E21B 44/00
700/275
2015/0167392 A1 6/2015 Sugiura

OTHER PUBLICATIONS

Bilgesu, et al., "A Real-Time Interactive Drill-off Test Utilizing Artificial Intelligence Algorithm for Dsats Drilling Automation University Competition", Society of Petroleum Engineers, Available Online at: https://www.onepetro.org/conference-paper/SPE-185730-MS?sort=&start=0&q=185730&fromyear=&peerreviewed=&publishedbetween=&fromSearchResults=true&to year=&rows=25#, Apr. 23, 2017, pp. 1-12.

Bouajaja, et al., "Methode de Recuit Simule Pour l'Optimisation de l'Affectation d'Opérateurs Sur Une Ligne De Production", International Journal of Business & Economic Strategy, vol. 5, No. 2, 2016, pp. 145-151.

Brochu, "Interactive Bayesian Optimization, Learning User Preferences for Graphics and Animation", Doctor of Philosophy in Computer Science Thesis, University of British Colombia, Vancouver, pp. 1-135, Dec. 2010.

Cox, "Adaptation of Simulated Annealing for Rate of Penetration Optimization in Automated Drilling", Master of Science Thesis, West Virginia University, Department of Petroleum and Natural Gas Engineering, pp. 1-45, 2017.

FR1860253, "Search Report", dated Nov. 26, 2019, 11 pages.

Osgouei, "Rate of Penetration Estimation Model for Directional and Horizontal Wells", Master Degree of Science Thesis, School of Natural and Applied Sciences, Middle East Technical University, pp. 1-98, Sep. 2007.

PCT/US2018/055570, "International Search Report and Written Opinion", dated Feb. 1, 2019, 13 pages.

Wang, et al., "A Novel Bayesian Optimization Framework For Computationally Expensive Optimization Problem in Tight Oil Reservoirs", SPE Annual Technical Conference and Exhibition, Oct. 2017, pp. 1-17.

* cited by examiner

SIMULATED ANNEALING ACCELERATED OPTIMIZATION FOR REAL-TIME DRILLING

TECHNICAL FIELD

The present disclosure relates generally to devices for use in well systems. More specifically, but not by way of limitation, this disclosure relates to real-time optimized control of a drilling tool during the drilling of a wellbore.

BACKGROUND

A well includes a wellbore drilled through a subterranean formation. The conditions inside the subterranean formation where the drill bit is passing when the wellbore is being drilled continuously change. For example, the formation through which a wellbore is drilled exerts a variable force on the drill bit. This variable force can be due to the rotary motion of the drill bit, the weight applied to the drill bit, and the friction characteristics of each strata of the formation. A drill bit may pass through many different materials, rock, sand, shale, clay, etc., in the course of forming the wellbore and adjustments to various drilling parameters are sometimes made during the drilling process by a drill operator to account for observed changes.

DETAILED DESCRIPTION

Figure 1:
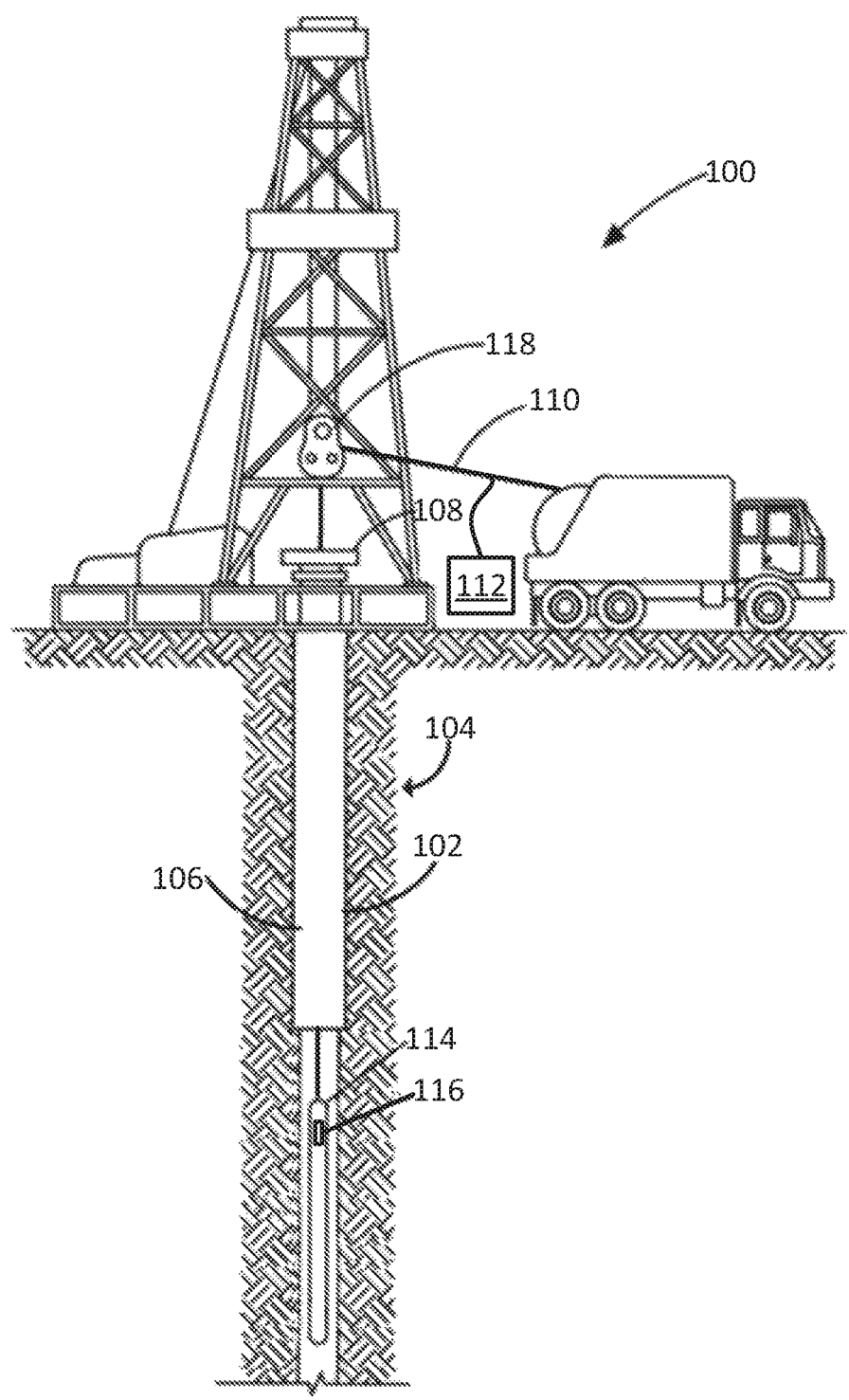
FIG. 1 is a cross-sectional view of an example of a well system that includes a computing device for controlling a drilling tool according to some aspects of the disclosure.

Certain aspects and features relate to a system that improves, and makes more efficient, the projection of an optimized value for a selected drilling parameter such as rate of penetration (ROP) by adjusting controllable parameters such as weight-on-bit (WOB), and drill bit rotational speed, for drilling operations. The controllable parameters can be computed, taking into account range constraints, and the parameters can be utilized for real-time, closed-loop control and automation in drilling to maintain the optimized value for the selected drilling parameter.

Certain aspects and features use simulated annealing and Bayesian optimization to quickly and accurately project optimum controllable drilling parameters for drilling optimization. In some aspects, a method or system is based on maximizing a resultant drilling parameter such as ROP. Certain aspects and features include the use of an initial value or initial values obtained from the simulated annealing. These initial values can be referred to herein as exploration points. The system can project optimized controllable drilling parameters in a given amount of time with less computing power and storage because the approach can drive optimization faster and as compared to approaches that do not use simulated annealing to produce the exploration points, such as those that use an acquisition function to provide exploration points. Alternatively, with a given computing resource, the computational speed of the process can decrease the optimization time required, provide more accurate results, and converge to the correct solution faster since accurate exploration points are provided by the simulated annealing.

In some examples, a system includes a drilling tool and a computing device in communication with the drilling tool. The computing device includes a non-transitory memory device storing instructions that are executable by the computing device to cause the computing device to perform operations. The operations include generating at least one value for at least one controllable drilling parameter using simulated annealing, executing a Bayesian optimization of a loss function using the at least one value to optimize the at least one controllable drilling parameter to produce an optimized value for the at least one controllable drilling parameter to achieve a predicted value for a selected drilling parameter. The optimized value can be applied to a drilling tool to achieve the predicted value for the selected drilling parameter.

In some examples, the selected drilling parameter is rate-of-penetration and in some examples, the controllable drilling parameters include at least one of rotational speed (RPM) or WOB. In some examples, the range constraints are associated with torque and drag, or whirl. In some examples, the operations performed by the computing device include applying the optimized value for the at least one controllable drilling parameter to the drilling tool in order to achieve real-time, closed-loop control through continuously updating the relevant parameters.

FIG. 1 is a cross-sectional side view of an example of a well system 100 according to some aspects. The well system 100 includes a wellbore 102 extending through a hydrocarbon bearing subterranean formation 104. In this example, the wellbore 102 is vertical, but in other examples the wellbore 102 can additionally or alternatively be horizontal or deviated.

In this example, the wellbore 102 includes a casing string 106 (e.g., a metal casing) extending from the well surface 108 into the subterranean formation 104. The casing string 106 can provide a conduit via which formation fluids, such as production fluids produced from the subterranean formation 104, can travel from the wellbore 102 to the well surface 108. In other examples, the wellbore 102 can lack the casing string 106.

The wellbore 102 can include a well tool 114 for performing one or more tasks in the wellbore 102. Examples of the well tool 114 can include a safety tool, valve tool, packer tool, drilling tool, monitoring tool, formation testing tool, a logging while drilling tool, or any combination of these. In some examples, the well tool 114 is deployed in the wellbore 102 using a wireline 110, slickline, or coiled tube, which can be wrapped around a winch 118 or pulley at the well surface 108. For purposes of the example optimization technique described herein, it can be assumed that well tool 114 is or includes a drilling tool.

The well system 100 can also include a computing device 112. The computing device 112 can be positioned at the well surface 108 or elsewhere (e.g., offsite). The computing device 112 may be in communication with the well tool 114, a sensor, or another electronic device. For example, the computing device 112 can have a communication interface for transmitting information to and receiving information from another communication interface 116 of the well tool 114.

In some examples, the computing device 112 can receive information from downhole (or elsewhere) in substantially real time, which can be referred to as real-time data. The real-time data can include information related to the well system 100. For example, the well tool 114 can stream real-time data to the computing device 112, where the real-time data includes information about the orientation or location of the well tool 114 in the wellbore 102, or a rate of movement of the well tool 114 through the wellbore 102. In one example, well tool 114 is a drilling tool with a drill bit. The computing device 112 can use the real-time data and the simulated annealing with Bayesian optimization as described herein with rate-of-penetration (ROP) of the well tool 114 through the subterranean formation 104 as the selected drilling parameter. A more specific example of the computing device 112 is described in greater detail below with respect to FIG. 2.

Figure 2:
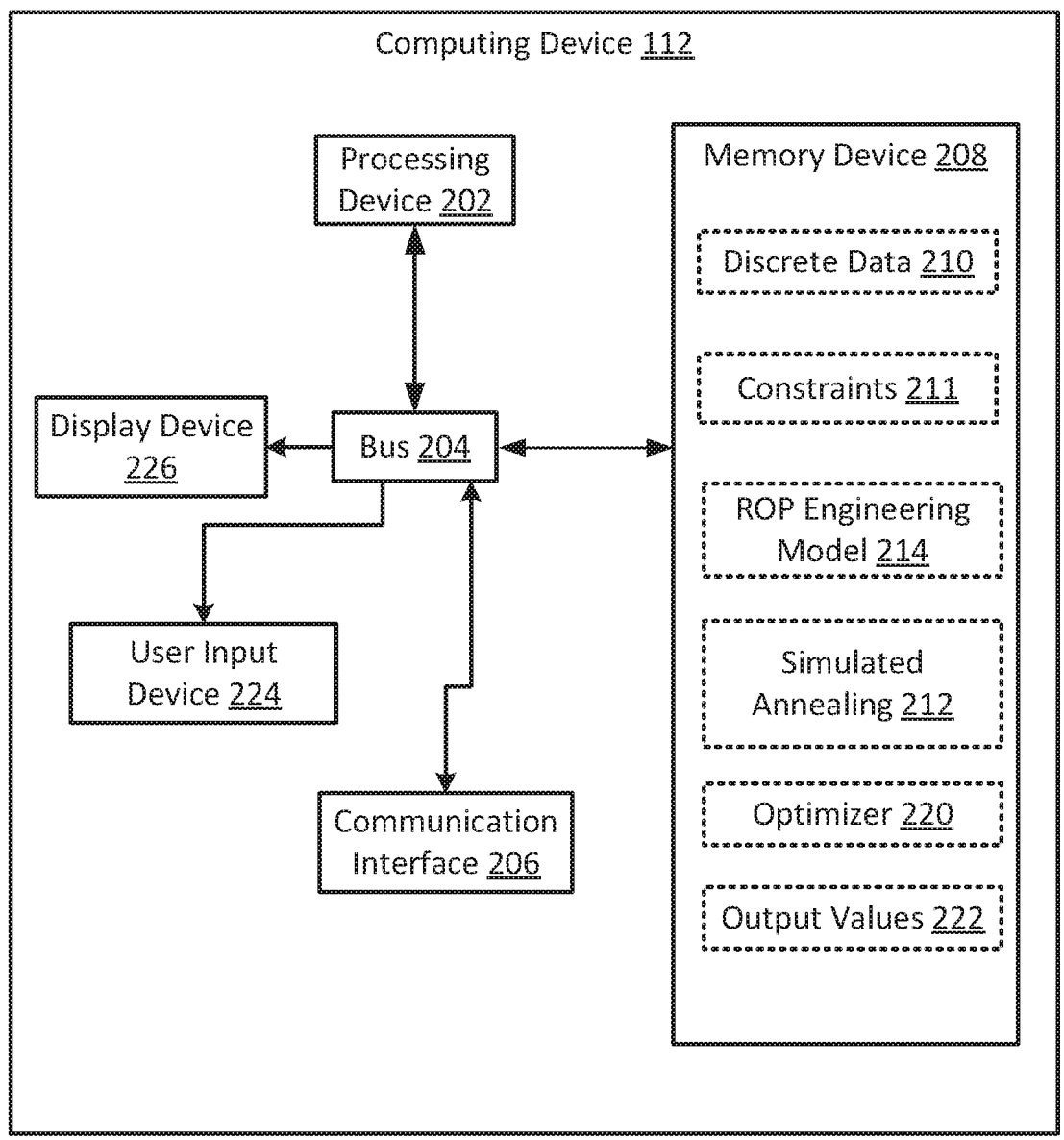
FIG. 2 is block diagram of a computing device for controlling a drilling tool according to some aspects of the disclosure.

FIG. 2 depicts an example of a computing device 112 according to one example. The computing device 112 can include a processing device 202, a bus 204, a communication interface 206, a memory device 208, a user input device 224, and a display device 226. In some examples, some or all of the components shown in FIG. 2 can be integrated into a single structure, such as a single housing. In other examples, some or all of the components shown in FIG. 2 can be distributed (e.g., in separate housings) and in communication with each other.

The processing device 202 can execute one or more operations for optimizing parameters for controlling a wellbore operation. The processing device 202 can execute instructions stored in the memory device 208 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessing device, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory computer-readable medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 208 can include discrete data 210, such as potential exploration points. The simulated annealing described herein selects an initial value from among potential exploration points, which may be stored from previous operations. The memory device 208 can also include constraints 211, such as engineering constraints and range constraints. In some examples, the memory device 208 can include a computer program code instructions 212 for simulated annealing (SA). The memory device 208 can include an ROP engineering model 214. The memory device 208 can include an optimizer 220. The optimizer can be for example computer program instructions to perform Bayesian optimization of the ROP and produce optimum values for controllable parameters such as WOB and RPM. Results from the optimizer can be stored as output values 222 in the memory device 208.

In some examples, the computing device 112 includes a communication interface 206. The communication interface 206 can represent one or more components that facilitate a network connection or otherwise facilitate communication between electronic devices. As an example, the communication interface 206 can be connected to the well tool 114 through communication interface 116. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 112 includes a user input device 224. The user input device 224 can represent one or more components used to input data. Examples of the user input device 224 can include a keyboard, mouse, touchpad, button, or touch-screen display, etc.

In some examples, the computing device 112 includes a display device 226. The display device 226 can represent one or more components used to output data. Examples of the display device 226 can include a liquid-crystal display (LCD), a television, a computer monitor, a touch-screen display, etc. In some examples, the user input device 224 and the display device 226 can be a single device, such as a touch-screen display.

Figure 3:
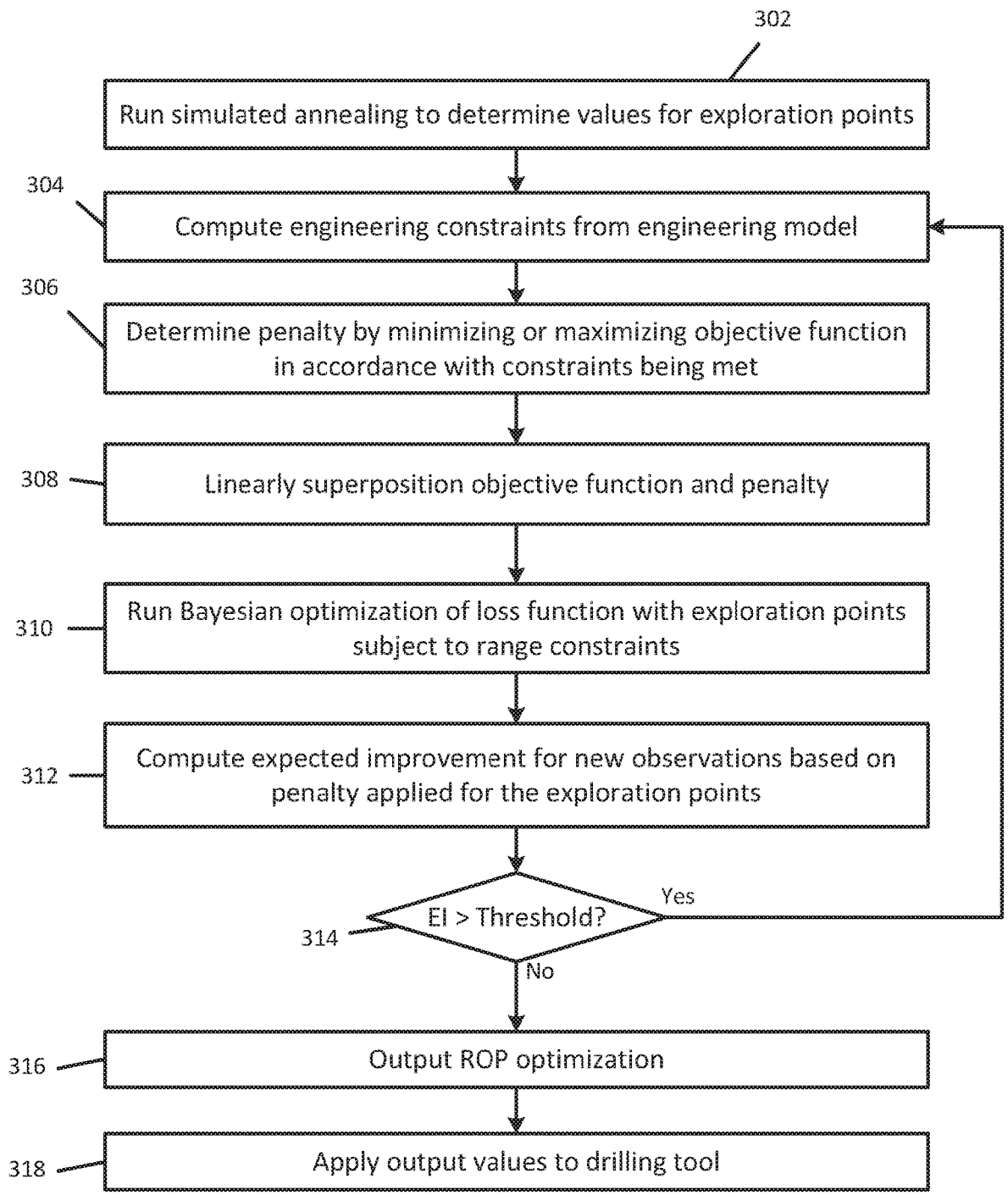
FIG. 3 is a flowchart illustrating a process for controlling a drilling tool according some aspects of the disclosure.

FIG. 3 is a flowchart illustrating an example of a process 300 for controlling a drilling tool according some aspects. In some aspects, the process 300 is carried out at least in part by computer program instructions 212 and 220. At block 302 of process 300, computing device 112 runs a simulated annealing to generate values for exploration points. Simulated annealing is a statistical process by which an objective function used for optimization is statistically quieted over time. This process is mathematically similar to the cooling that takes place to anneal metal. Exploration points are initially selected values for the variables to be optimized, for example, the controllable drilling parameters. These exploration points can be tested over time through optimization and the values move closer to the ideal solution. Generally values for exploration are randomly selected by simulated annealing, but only from among values close to the solution as determined from previous optimization iterations or initially from sampled data, for example, data from actual operating equipment or from a model.

Continuing with FIG. 3, at block 304, the stored engineering model 214 is accessed to determine engineering constraints, which determine range constraints for the various input and output parameters. Examples of constraints include whirl, torque and drag, and fluid pumping rate. These constraints result from inherent physical and structural limitations of the drilling equipment. Whirl can be a disruptive resonance in the drillstring at certain speeds typically measured in revolutions per minute (RPM). Ranges around these RPM values can be avoided. The RPM values can change with the length and depth of the drillstring. Pumping rate can be the maximum rate at which debris-filled fluid can be removed from the wellbore. The rate of penetration of the drill bit may not exceed that which creates the maximum amount of debris that can be removed from the wellbore by fluid pumping in a specified amount of time. Torque and drag can result from forces exerted on the drill bit by friction with the subterranean formation in which the wellbore is being formed.

Still referring to FIG. 3, at block 306, computing device 112 determines a penalty to be applied to the objective function by minimizing or maximizing the objective function in accordance with whether the constraints are being met. At block 308, computing device 112 sets the loss function for optimization to be a linear superposition of the objective function and the penalty. An example of a loss function (sometimes referred to as a cost function) as a linear superposition of the actual objective function and the penalty terms is shown in equation (1). In equation (1), penalty constant k depends on the scale of the computed objective function.

$$\text{loss function} = \text{objective function} + \text{penalty} \quad (1)$$

Penalty =

$$\begin{cases} 0 (\text{Constraint is not met}) \\ k * \text{Max(Observations)} \begin{pmatrix} \text{constraint is met and the objective} \\ \text{function is minimized}, k > 1 \end{pmatrix} \\ k * \text{Min(Observations)} \begin{pmatrix} \text{Constraint is met and the objective} \\ \text{function is maximized}, k < 1 \end{pmatrix} \end{cases}$$

At block 310 of process 300, computing device 112 executes optimizer 220 to run a Bayesian optimization of the loss function defined above using the exploration points from the simulated annealing subject to the range constraints. The expected improvement (EI) for the resulting new observations is computed based on the penalty and new exploration points are computed at block 312. Using EI allows the algorithm to implicitly learn the constraint region based on the penalty applied to the cost function to sample the points. The expected improvement for this Bayesian optimization in this example is shown in equation (2):

$$EI_{BO} = \sigma \int_{-\infty}^{f'_{min}} (f'_{min} - z)\phi(z)dz = \sigma[(f'_{min}\Phi(f'_{min}) + \phi(f'_{min}))], \quad (2)$$

where $\Phi(f'_{min})$ is the cumulative distribution function and $\phi(f'_{min})$ is the probability density function, $$f'_{min} = \frac{f_{min} - \mu}{\sigma}, z = \frac{y - \mu}{\sigma},$$

$\mu$ is me mean and $\sigma$ is the variance.

The EI for simulated annealing accelerated Bayesian optimization (SAABO) can be described as:

$$EI_{SAABO} = \sigma \int_{-\infty}^{f'_{min}} (f'_{min} - z_{SAABO})\phi(z_{SAABO})dz_{SAABO} \quad (3)$$

$$z_{SAABO} \approx f'_{min} \quad (4a)$$

$$z_{SAABO} = \{z_{1optimum}, z_{2optimum} \ldots z_{noptimum}\} \quad (4b)$$

$$EI_{SAABO} \approx 0 \le EI_{BO} \quad (5)$$

The expected improvement with SAABO ($EI_{SAABO}$) will be less than $EI_{BO}$ because simulated annealing brings $z_{SAABO}$ close to $f'_{min}$, as shown in equation (4a). $z_{SAABO}$ is a distribution of optimal values (equation 4b) resulting from plausible SA paths. Substituting equation (4a) in equation (3) brings $EI_{SAABO}$ close to zero, as shown in equation (5). Bringing $EI_{SAABO}$ close to zero enables faster convergence because the optimization is placed into an exploitation phase.

Continuing with FIG. 3, if the EI is above a desired threshold value at block 314, another iteration begins from block 304. Otherwise, the improvement is treated as sufficient and the ROP optimization values are output at block 316 and stored as output values 222. The output values can then be applied to the drilling tool at block 318.

The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a system using simulated annealing accelerated optimization is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a drilling tool and a computing device in communication with the drilling tool. The computing device includes a non-transitory memory device comprising instructions that are executable by the computing device to cause the computing device to perform operations. The operations include generating at least one value for at least one controllable drilling parameter using simulated annealing, executing a Bayesian optimization of a loss function using the at least one value to optimize the at least one controllable drilling parameter to produce an optimized value for the at least one controllable drilling parameter to achieve a predicted value for a selected drilling parameter, and applying the optimized value to the drilling tool to achieve the predicted value for the selected drilling parameter.

Example 2. The system of example 1 wherein the selected drilling parameter includes rate-of-penetration.

Example 3. The system of example(s) 1-2 wherein the controllable drilling parameter includes rotational speed, weight-on-bit, or both.

Example 4. The system of example(s) 1-3 wherein the operations include computing range constraints using at least one engineering constraint, wherein the Bayesian optimization is subject to the range constraints. The operations also include linearly superpositioning a penalty and an objective function to produce the loss function.

Example 5. The system of example(s) 1-4 wherein the range constraints are associated with at least one of torque and drag, or whirl.

Example 6. The system of example(s) 1-5 wherein operations include determining an expected improvement in the selected drilling parameter, and executing the Bayesian optimization subject to the range constraints while the expected improvement in the selected drilling parameter is above a threshold value.

Example 7. The system of example(s) 1-6 wherein the operations include accessing an engineering model for the selected drilling parameter; and performing the simulated annealing using the engineering model.

Example 8. A method includes generating at least one value for at least one controllable drilling parameter using simulated annealing, executing a Bayesian optimization of a loss function using the at least one value to optimize the at least one controllable drilling parameter to produce an optimized value for the at least one controllable drilling parameter to achieve a predicted value for a selected drilling parameter, and applying the optimized value to a drilling tool to achieve the predicted value for the selected drilling parameter.

Example 9. The method of example 8 wherein the selected drilling parameter includes rate-of-penetration.

Example 10. The method of example(s) 8-9 wherein the controllable drilling parameter includes rotational speed, weight-on-bit, or both.

Example 11. The method of example(s) 8-10 further includes computing range constraints using at least one engineering constraint, wherein the Bayesian optimization is subject to the range constraints. The method also includes linearly superpositioning a penalty and an objective function to produce the loss function.

Example 12. The method of example(s) 8-11 wherein the range constraints are associated with at least one of torque and drag, or whirl.

Example 13. The method of example(s) 8-12 further includes determining an expected improvement in the selected drilling parameter, and executing the Bayesian optimization subject to the range constraints while the expected improvement in the selected drilling parameter is above a threshold value.

Example 14. The method of example(s) 8-13 further includes accessing an engineering model for the selected drilling parameter, and performing the simulated annealing using the engineering model.

Example 15. A non-transitory computer-readable medium includes instructions that are executable by a processing device for causing the processing device to perform a method. The method include generating at least one value for at least one controllable drilling parameter using simulated annealing, executing a Bayesian optimization of a loss function using the at least one value to optimize the at least one controllable drilling parameter to produce an optimized value for the at least one controllable drilling parameter to achieve a predicted value for a selected drilling parameter, and applying the optimized value to a drilling tool to achieve the predicted value for the selected drilling parameter.

Example 16. The non-transitory computer-readable medium of example 15 wherein the selected drilling parameter includes rate-of-penetration.

Example 17. The non-transitory computer-readable medium of example(s) 15-16 wherein the controllable drilling parameter includes rotational speed, weight-on-bit, or both.

Example 18. The non-transitory computer-readable medium of example(s) 15-17 wherein the method includes computing range constraints using at least one engineering constraint, wherein the range constraints are associated with at least one of torque and drag, or whirl. The method also includes linearly superpositioning a penalty and an objective function to produce the loss function.

Example 19. The non-transitory computer-readable medium of example(s) 15-18 wherein the method includes determining an expected improvement in the selected drilling parameter, and executing the Bayesian optimization subject to the range constraints while the expected improvement in the selected drilling parameter is above a threshold value.

Example 20. The non-transitory computer-readable medium of example(s) 15-19 wherein the method includes accessing an engineering model for the selected drilling parameter, and performing the simulated annealing using the engineering model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a drilling tool; and
    a computing device in communication with the drilling tool, the computing device including a non-transitory memory device comprising instructions that are executable by the computing device to cause the computing device to perform operations comprising:
        generating at least one value for at least one controllable drilling parameter using simulated annealing;
        executing a Bayesian optimization of a loss function using the at least one value to optimize the at least one controllable drilling parameter to produce an optimized value for the at least one controllable drilling parameter to achieve a predicted value for a selected drilling parameter; and
        applying the optimized value to the drilling tool to achieve the predicted value for the selected drilling parameter.

2. The system of claim 1 wherein the selected drilling parameter comprises rate-of-penetration.

3. The system of claim 1 wherein the controllable drilling parameter comprises at least one of rotational speed or weight-on-bit.

4. The system of claim 1 wherein the operations further comprise:
    computing range constraints using at least one engineering constraint, wherein the Bayesian optimization is subject to the range constraints; and
    linearly superpositioning a penalty and an objective function to produce the loss function.

5. The system of claim 4 wherein the range constraints are associated with at least one of torque and drag, or whirl.

6. The system of claim 4 wherein operations further comprise:
    determining an expected improvement in the selected drilling parameter; and
    executing the Bayesian optimization subject to the range constraints while the expected improvement in the selected drilling parameter is above a threshold value.

7. The system of claim 1 wherein the operations further comprise:
    accessing an engineering model for the selected drilling parameter; and
    performing the simulated annealing using the engineering model.

8. A method comprising:
generating at least one value for at least one controllable drilling parameter using simulated annealing;
executing a Bayesian optimization of a loss function using the at least one value to optimize the at least one controllable drilling parameter to produce an optimized value for the at least one controllable drilling parameter to achieve a predicted value for a selected drilling parameter; and
applying the optimized value to a drilling tool to achieve the predicted value for the selected drilling parameter.

9. The method of claim 8 wherein the selected drilling parameter comprises rate-of-penetration.

10. The method of claim 8 wherein the controllable drilling parameter comprises at least one of rotational speed or weight-on-bit.

11. The method of claim 8 further comprising:
computing range constraints using at least one engineering constraint, wherein the Bayesian optimization is subject to the range constraints; and
linearly superpositioning a penalty and an objective function to produce the loss function.

12. The method of claim 11 wherein the range constraints are associated with at least one of torque and drag, or whirl.

13. The method of claim 12 further comprising:
determining an expected improvement in the selected drilling parameter; and
executing the Bayesian optimization subject to the range constraints while the expected improvement in the selected drilling parameter is above a threshold value.

14. The method of claim 8 further comprising:
accessing an engineering model for the selected drilling parameter; and
performing the simulated annealing using the engineering model.

15. A non-transitory computer-readable medium that includes instructions that are executable by a processing device for causing the processing device to perform a method comprising:
generating at least one value for at least one controllable drilling parameter using simulated annealing;
executing a Bayesian optimization of a loss function using the at least one value to optimize the at least one controllable drilling parameter to produce an optimized value for the at least one controllable drilling parameter to achieve a predicted value for a selected drilling parameter; and
applying the optimized value to a drilling tool to achieve the predicted value for the selected drilling parameter.

16. The non-transitory computer-readable medium of claim 15 wherein the selected drilling parameter comprises rate-of-penetration.

17. The non-transitory computer-readable medium of claim 15 wherein the controllable drilling parameter comprises at least one of rotational speed or weight-on-bit.

18. The non-transitory computer-readable medium of claim 15 wherein the method further comprises:
computing range constraints using at least one engineering constraint, wherein the range constraints are associated with at least one of torque and drag, or whirl; and
linearly superpositioning a penalty and an objective function to produce the loss function.

19. The non-transitory computer-readable medium of claim 18 wherein the method further comprises:
determining an expected improvement in the selected drilling parameter; and
executing the Bayesian optimization subject to the range constraints while the expected improvement in the selected drilling parameter is above a threshold value.

20. The non-transitory computer-readable medium of claim 15 wherein the method further comprises:
accessing an engineering model for the selected drilling parameter; and
performing the simulated annealing using the engineering model.

\* \* \* \* \*